| United States Patent [19] | [11] Patent Number: 4,627,932 |
|---|---|
| Goel et al. | [45] Date of Patent: Dec. 9, 1986 |

[54] BICYCLIC AMIDE ACETALS AS MOISTURE SCAVENGERS

[75] Inventors: Anil B. Goel, Worthington; Harvey J. Richards, Columbus, both of Ohio

[73] Assignee: Ashland Oil, Inc., Ashland, Ky.

[21] Appl. No.: 697,830

[22] Filed: Feb. 4, 1985

[51] Int. Cl.$^4$ ............................................. C09K 3/00
[52] U.S. Cl. ................................. 252/194; 252/182
[58] Field of Search ........................... 252/182, 194

[56] References Cited

U.S. PATENT DOCUMENTS

| 3,223,713 | 12/1965 | Kesslin et al. | 252/194 |
| 3,703,468 | 11/1972 | Chess et al. | 252/194 |
| 4,182,846 | 1/1980 | Saegusa et al. | 528/341 |
| 4,354,028 | 10/1982 | Martin et al. | 252/194 |
| 4,501,679 | 2/1985 | Reierson et al. | 252/77 |
| 4,549,005 | 10/1985 | Goel | 528/53 |
| 4,558,113 | 12/1985 | Goel | 528/59 |
| 4,584,363 | 4/1986 | Goel et al. | 528/73 |

*Primary Examiner*—Edward A. Miller
*Attorney, Agent, or Firm*—John F. Jones

[57] ABSTRACT

A process for removing water from its mixture with hydroxyl containing compounds by adding a bicyclic amide acetal to such mixture and allowing the water to react with the bicyclic amide acetal is disclosed.

4 Claims, No Drawings

BICYCLIC AMIDE ACETALS AS MOISTURE SCAVENGERS

This invention relates to a method for removing trace amounts of water from organic materials and more particularly pertains to a method for removal of water from organic materials including monomers and polymers by treatment of these materials with bicyclic amide acetals.

Bicyclic amide acetals are relatively new materials. The preparation of some of the bicyclic amide acetals is more fully disclosed in the copending U.S. patent applications of Anil B. Goel and of Anil B. Goel and Harvey J. Richards, respectively, filed as Ser. Nos. 641,238 and 641,242 on Aug. 16, 1984.

Bicyclic amide acetals have been shown to undergo hydrolysis with excess of water to give the corresponding amide diol [Ann. Chem. 716,135 (1968)] but no report or suggestion has been made that these materials might have unique water scavenging properties in the presence of monomers, polymers, and particularly materials which have reactive hydrogen functionality such as hydroxyl groups.

We have discovered that bicyclic amide acetals as more fully described below are especially useful in dehydrating organic materials such as the polyols used in the synthesis of polyurethanes. It is well known that when moisture is present in polyols used in the manufacture of polyurethanes that foaming occurs which adversely affects the properties of the resulting polymeric product. In the case of the polyol, the use of a bicyclic amide acetal as water scavenging agent produces a mixture of polyol and amide diol, both of which are used up in the reaction with polyisocyanate without the generation of gaseous by-products which would cause foaming and bubbling in the polyurethane product. In addition to the need for such a moisture scavenging agent for polyols, there is also a need for such an agent for the dehydration of organic materials including solvents, monomers, polymers, and the like.

The bicyclic amide acetals which are useful in this invention include those having the Formula I wherein

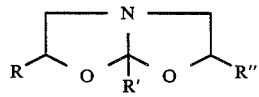

wherein R and R" independently represent hydrogen or an alkyl group having from 1 to 18 carbon atoms, and R" also represents an alkyl ether, aryl or alkaryl ether group having from 1 to 18 carbon atoms, and R' represents an alkyl group having from 1 to 18 carbon atoms, an aryl group having from 6 to 12 carbon atoms, or an alkaryl group having from 7 to 20 carbon atoms.

Materials which can be conveniently dehydrated by bicyclic amide acetals include mono- and poly-hydroxy compounds. Mono hydroxy compounds include vinyl monomers such as hydroxyethyl acrylate, hydroxypropyl acrylate, hydroxyethyl methacrylate, hydroxypropyl methacrylate, and the like.

Polyhydroxy compounds include those having at least two hydroxyl groups per molecule and having equivalent weights falling in the range of from 20 to 5000. Specific polyols include butane diol, cyclohexane dimethanol, tripropylene glycol, amide diols of the type

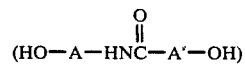

wherein A and A' are alkyl or aryl groups having from 2 to 20 carbon atoms, urethane diols of the type

wherein A and A' have the above designations, polyether polyols such as poly(tetra-methylene ether) diols, poly(propylene ether) polyols, polyester polyols, and the like.

Polyhydroxy polyethers can be prepared by the polymerization of epoxides such as ethylene oxide, propylene oxide, butylene oxide, tetrahydrofuran, styrene oxide, or epichlorohydrin either on their own or by chemical addition to other materials. Suitable other materials include ethylene glycol, propylene glycol, trimethylol propanes and 4,4'-dihydroxy diphenyl propane. Sucrose polyethers also may be used. Polybutadienes having hydroxyl groups as well as other known hydroxyl containing vinyl addition polymerized polymers can be used.

According to this invention, hydroxyl containing polyesters, polythioethers, polyacetals, polycarbonates or polyester amides of the types known for the formation of polyurethanes may also be used.

Particularly useful polyols for the present invention include the following representative aliphatic and aromatic polyhydric alcohols.

Aliphatic Polyhydric Alcohols ethylene glycol
propylene glycol
trimethylene glycol
triethylene glycol
pentaethylene glycol
polyethylene glycol
1,4-butane diol
diethylene glycol
dipropylene glycol
2,2-dimethyl-1,3-propane diol
hexamethylene glycol
1,4-cyclohexane dimethanol

Aromatic Polyhydric Alcohols xylene polyols
ethyl resorcinol
propyl resorcinol
2,4-dimethyl resorcinol
3,6-dimethyl-1,2,4-benzene triol
ethyl pyrogallol
2,4-methyl-1,4-dihydroxy naphthalene
3-methyl-1,4,5-naphthalene triol
dimethylol toluene
dimethylol xylene
bis-hydroxyethyl or bis-hydroxy propyl ethers of resorcinol , catechol or hydroquinene
1,5-dihydroxynaphthalene,
4,4'-isopropylidene-bis-phenol, and the like.

The process of this invention can be carried out in the temperature range of from about room temperature up to about 200° C.

The process of this invention is further illustrated in the following representative examples.

EXAMPLE 1

A sample of ethylene glycol (100 g) containing 0.36% by weight of water was treated with 2.8 grams of a bicyclic amide acetal of Formula I in which R' represents methyl and R, and R" represent hydrogen, and the mixture was allowed to stand for 22 hours at room temperature after which the mixture was analyzed for water and was found to contain only 16 ppm of water.

EXAMPLE 2

The procedure of Example 1 was followed using 45 grams of glycerol containing 0.48% by weight of water and 1.7 grams of the bicyclic amide acetal. The final mixture after 22 hours standing at room temperature was, found to contain 20 ppm of water.

EXAMPLE 3

The procedure of Example 1 was repeated using tripropylene glycol (40 grams) containing 1.00% by weight of water and 3.1 grams of the bicyclic amide acetal. The final mixture after standing 22 hours at room temperature was found to contain 72 ppm of water.

EXAMPLE 4

The procedure of Example 1 was repeated using ethanolamine (37 g) containing 0.42% by weight of water and 1.21 grams of the bicyclic amide acetal. The final mixture was found to contain 0.30% by weight of water.

EXAMPLE 5

The procedure of Example 1 was followed using 101.2 g of poly(tetramethylene ether) diol having an equivalent weight of 492 and containing 0.472% by weight of water and 4.1g of the bicyclic amide acetal. The reaction mixture after standing at 50° C. for 18 hours was found to contain 15 ppm of water.

EXAMPLE 6

The procedure of Example 1 was followed using 100.2 g of poly(tetramethylene ether) diol having an equivalent weight of 320 and containing 0.271% by weight of water and 2.34 g of bicyclic amide acetal. The final mixture after standing at 50° C. for 18 hours was found to contain 17 ppm of water.

EXAMPLE 7

The procedure of Example 1 was followed using 100.4 g of poly(propylene glycol ether) diol having an equivalent weight of 212 containing 0.388% by weight of water and 3.35 g of the bicyclic amide acetal. The final mixture after standing at 50° C. for 18 hours was found to contain 16 ppm of water.

EXAMPLE 8

The procedure of Example 1 was followed using 100.5 g of poly(propylene glycol ether) diol having an equivalent weight of 1039 and containing 0.434% by weight of water and 3.75 g of the bicyclic amide acetal. After standing at 50° C. for 18 hours the mixture was found to contain 25 ppm of water

EXAMPLE 9

The procedure of Example 1 was followed using 100.2 g of poly(propylene ether) tetraol having a hydroxyl number of 555 containing 0.438% by weight of water and 3.78 g of the bicyclic amide acetal. The final mixture after standing for 18 hours at 50° C. was found to contain 24 ppm of water.

EXAMPLE 10

The procedure of Example 1 was followed using 100.5 g of poly(propylene ether) tetraol having a hydroxyl number of 450 containing 0.278% by weight of water and 2.41 g of bicyclic amide acetal. The final mixture after standing at 50° C. for 18 hours was found to contain 3 ppm of water.

EXAMPLE 11

The procedure of Example 1 was followed using 100.4 g of poly(caprolactone) diol having an equivalent weight of 261 containing 0.392% by weight of water and 3.39 g of the bicyclic amide acetal. The final mixture after standing 18 hours at 50° C. was found to contain no water.

EXAMPLE 12

The procedure of Example 1 was followed using a mixture of 102.1 g of a mixture of diethylene glycol and a poly(terephthalic ester) polyol having an acid value of 3 and a hydroxyl number of 418 containing 0.342% by weight of water and 3.01 g of the bicyclic amide acetal. The final mixture after standing 18 hours at 50° C. was found to contain 0.08% by weight of water.

EXAMPLE 13

The procedure of Example 1 was followed using 100.6 g of ethylene oxide treated dimerized linoleic acid containing 0.351% by weight of water and 3.049 by the bicyclic amide acetal. The final mixture after standing for 18 hours at 50° C. was found to contain 6 ppm of water.

EXAMPLE 14

The procedure of Example 1 was followed using 99.95 g of a urethane diol obtained from the equimolar reaction of ethylene carbonate and ethanol amine containing 1.667% by weight of water and 14.3 g of the bicyclic amide acetal. The mixture was found to contain only 28 ppm of water after standing at 50° C. for 18 hours.

EXAMPLE 15

The procedure of Example 1 was followed using 100.3 g of an amide diol prepared by reaction of gamma-butyrolactone and 1-amino-2-propanol, 0.487% by weight of water and 4.21 g of bicyclic amide acetal. The mixture was found to contain 49 ppm of water after standing at 50° C. for 18 hours.

EXAMPLE 16

The procedure of Example 1 was followed using 101.4 g of hydroxy propyl methacrylate containing 0.446% by weight of water and 3.84 g of bicyclic amide acetal. The mixture after standing at room temperature for 18 hours was found to contain 81 ppm of water.

EXAMPLE 17

This example demonstrates that polyols containing low levels of water produce bubble-free polyurethanes upon reaction with a polyisocyanate. Poly(tetramethylene ether) diol (96 g) which had been treated with bicyclic amide acetal as shown in Example 13, was degassed on a rotary evaporator and mixed rapidly with 96 g of degassed, liquid 4,4'-methylene bis(phenyl isocyanate) and the mixture was quickly poured into a mold made from two glass plates separated by ⅛" spacers. The filled mold was heated at 100° C. for 1 hour and then at 130° C. for two hours. The resulting flexible polyurethane sheet which had a class A surface was found to have an ASTM notched izod impact strength of 6 foot pounds/inch of notch and an unnotched izod impact strength of 20 foot pounds.

EXAMPLE 18

This example which is outside the scope of this invention demonstrates what happens when appreciable amounts of water are present in a diol and a polyurethane is prepared therefrom as in Example 17. A poly(tetramethylene ether) diol having an equivalent weight of 320 and containing 0.27% by weight of water was degassed and mixed with 90 g of degassed liquid 4,4'-methylene bis(phenyl isocyanate) and 0.2 g of a tertiary amine catalyst. A vigorous reaction resulted within 5 minutes. The mixture was poured into the mold described in Example 17 and was cured as described in Example 17. The resulting sheet was full of bubbles.

EXAMPLE 19

The bis hydroxyethyl dimerate of Example 6 (96.9) which had been treated with bicyclic amide acetal to remove water was degassed and mixed with 50 g of degassed liquid 4,4'-methylene bis(phenyl isocyanate). The resulting mixture was poured into a mold and cured as described in Example 17 and after curing the polymer sheet was found to have a Class A surface, was bubble-free and had a notched izod impact strength of 5 foot pounds/inch of notch and an unnotched izod impact strength of more than 20 foot pounds.

EXAMPLE 20

When degassed bis(hydroxy ethel)dimerate (95 g) containing 0.35% by weight of water was mixed with 45 g of degassed liquid 4,4'-methylene bis(phenyl isocyanate) in the presence of a tertiary amine catalyst, a rapid reaction was observed. After curing the polymer as in Example 19, the polymer was found to contain many bubbles.

We claim:

1. The method for removing water from mixtures of mono-hydroxyl vinyl monomers and water comprising adding to said mixtures a bicyclic amide acetal and allowing the water to react with the bicyclic amide acetal at a temperature in the range of from about room temperature up to about 200° C.

2. The process of claim 1 wherein the bicyclic amide acetal is one having the formula

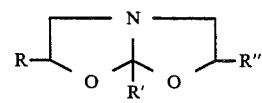

wherein R and R" independently represent hydrogen or an alkyl group having from 1 to 18 carbon atoms, and R" also represents an alkyl ether, aryl or alkaryl ether group having from 1 to 18 carbon atoms, and R' represents an alkyl group having from 1 to 18 carbon atoms, an aryl group having from 6 to 12 carbon atoms, or an alkaryl group having from 7 to 20 carbon atoms.

3. The process of claim 2 wherein the bicyclic amide acetal is one in which R and R" are hydrogen and R' is methyl.

4. The process of claim 3 wherein the hydroxyl compound is hydroxy propyl methacrylate.

* * * * *